(12) United States Patent
Fukushi

(10) Patent No.: US 6,226,105 B1
(45) Date of Patent: May 1, 2001

(54) SYSTEM FOR PROCESSING IMAGES BY SELECTING APPROPRIATE DOCUMENT SIZE

(75) Inventor: Kazuhito Fukushi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/090,973

(22) Filed: Jun. 5, 1998

(30) Foreign Application Priority Data

Jun. 11, 1997 (JP) .................................................. 9-153855

(51) Int. Cl.$^7$ .................................................. H04N 1/387
(52) U.S. Cl. .............................................. 358/452; 358/450
(58) Field of Search ............................... 358/449, 452, 358/401, 451, 453, 527, 450; 345/115, 127, 129, 131; 382/284, 298

(56) References Cited

U.S. PATENT DOCUMENTS

| | | | | |
|---|---|---|---|---|
| 5,517,319 | * | 5/1996 | Arai | 358/300 |
| 5,781,175 | * | 10/1999 | Hara | 345/127 |
| 5,794,104 | * | 8/1998 | Maruyama | 399/183 |
| 5,828,461 | * | 10/1998 | Kubo et al. | 358/296 |
| 5,909,290 | * | 6/1999 | Kajiwara | 358/488 |
| 5,973,691 | * | 10/1999 | Servan-Schreiber | 345/342 |
| 5,999,767 | * | 12/1999 | Ando | 399/85 |

FOREIGN PATENT DOCUMENTS

| | | |
|---|---|---|
| 54-92318 | 7/1979 | (JP) . |
| 64-578 | 1/1989 | (JP) . |

* cited by examiner

*Primary Examiner*—Cheukfan Lee

(57) ABSTRACT

A photomontage system which can select an appropriate document size of a picture to be sensed without requiring user's knowledge about the document sizes, and carry out effective image processing in accordance with the size. An image reader scans in a maximum size a printed photograph placed thereon, and supplies a main processor with the sensed image. The main processor applies the sensed image into service size frames in a display processor, and displays them as a selection picture. In response to the selection of a user who selects the picture (frame) that correctly displays the sensed image, a operation detector circuit detects its document size, and sends a command to a combiner processor. In accordance with the selected document size, the combiner processor clips an image from the sensed image and combines it with a prepared image. The composite image is supplied to a printer to be printed out.

29 Claims, 6 Drawing Sheets

SYSTEM FOR PROCESSING IMAGES BY SELECTING APPROPRIATE DOCUMENT SIZE

BACKGROUND OF THE INVENTION

1. Field of the Invention

The present invention relates to an image processing system, and more particularly to an image processing system for producing user-desired composite photographs from pictures such as printed photographs by his or her manipulating the system installed at a storefront.

2. Description of the Background Art

Recently, a photographic system, which takes portraits and produces original composite photographs by adding to their background novel or brilliant designs, enlivens an amusement arcade. The photo-graphic system includes, for example, in a box-like housing an image pickup device such as an electronic camera for taking portraits in a fixed focus, a combining processor for combining through digital processing the picked-up images with background images prepared in advance, and a printer for printing combined images, and produces composite photographs of a subject through the user operation like coin insertion. It usually takes only certain photographs from a fixed angle of view, such as upper half portraits.

On the other hand, it is known that a photo-finishing laboratory, a so-called photo lab offers a service which creates original documents by printing on postcards or calendars pictures obtained from negatives taken by a user. The service can further enhance its originality because it can select expressive portraits in various conditions or environments, or favorite pictures of the user.

The latter case, however, takes a greater time and labor than the photographic system because it is necessary for users to make a request to a specialty store. In view of this, the inventor or the assignee of the present invention plans to propose an image processing system or photomontage system which can be easily operated by a user like a copy machine, and generate in a short time original pictures the user desires by selecting images from printed photographs or the like on which desired images are printed.

In particular, when reading images from printed photographs with such a system, it must be taken into account that there are various service sizes in printed photographs such as economy (EC) size, L size, high-definition television (HV) size, king (KG) size and 2L size. Without considering this, user-desired pictures may not be obtained.

Conventionally, such apparatuses that detect sizes of the processed document are disclosed, for example, in Japanese patent laid-open publication Nos. 92318/1979 and 578/1989, which are applied to copy machines or the like. The former publication discloses an apparatus that comprises a size sensor like a photodetector, and carries out processing such as scaling or magnifying/reducing after detecting the size of a document placed on a scanner while moving the size sensor which is mounted on a paper depressor of a copy machine slidably in the longitudinal and lateral directions for detecting edges of the document.

The latter publication discloses a system that carries out processing by sensing a pattern like a bar code which is put on a document in advance to indicate a control mode such as a copy size, scaling size or factor, and the number of copies.

The conventional techniques, however, have some problems. First, the former apparatus requires a mechanism for detecting or determining the document size and a controller for controlling it, which presents a problem of complicating the apparatus and increasing its cost.

The latter apparatus has a problem of imposing a burden on users because they must put the bar code or the like on the document in advance. In particular, a problem can arise from the facts that common users are rather unconscious of the document size like the above-mentioned service sizes of printed photographs, or that even if they know it, they cannot distinguish small size differences on the spot.

SUMMARY OF THE INVENTION

The present invention is implemented to solve the foregoing drawbacks of the conventional techniques. It is therefore an object of the present invention to provide an image processing system capable of processing images by selecting a correct document size without adding any mechanism for detecting or determining the document size, or without any knowledge of the document size, and to provide a photomontage system capable of producing desired composite photographs by selecting desired images from printed photographs through simple operation.

According to the present invention, there is provided an image processing system for processing an image provided from an outside source, the image processing system comprising: an image reader for sensing an image from a document on which a picture to be processed is printed, the document being of one of a plurality of document sizes; a display unit for displaying images based on the image sensed by the image reader, the images being displayed in a plurality of forms in accordance with the respective document sizes; a selection operation unit for selecting, from among the images displayed on the display unit, an image of a desired document size to be processed; and an image processor for processing the image selected by the selection operation unit, in accordance with its document size.

Here, the image reader may advantageously comprise a flat-bed type image scanner with a flat scanner surface on which a document is placed, and the image scanner scans the document in a scanning field defined by a maximum one of the document sizes independently of the actual document size of the document placed on the image scanner.

The image reader may advantageously comprise a paper depressor for pressing the document placed thereon against the scanner surface, the paper depressor being provided, on a surface opposite to the scanner surface, with border indications indicative of scanning fields associated with the document sizes, and with marks added outside the boarder indications each to represent the document sizes, the border indications and marks being sensible by the image reader in conjunction with the read image.

The display unit may display a plurality of frames whose sizes are determined in advance in accordance with the document sizes, and display in the frames images which are clipped, in accordance with the document sizes, from the image sensed by the image reader, and are applied to the frames.

The display unit may display a plurality of frames whose sizes are determined in advance in accordance with the document sizes, and display in the frames images which are clipped, in accordance with the document sizes, from the image sensed by the image reader, undergo scaling to nearly a same size, and are applied to the frames.

The display unit may display a plurality of frames whose sizes are determined in advance in accordance with the document sizes, and display in the frames images which are clipped, in accordance with the document sizes, from the image sensed by the image reader, and are applied to the frames, the images in the frames including first regions to be processed by the image processor and second regions not to be processed by the image processor, the first regions and second regions being displayed in a visually distinguishable manner.

The display unit may display the first regions and second regions with luminances different from each other, or with shadowing either of the first and second regions.

The display unit may display the images in the frames in a manner that they are rotatable together with the frames.

The selection operation unit may comprises a touch panel provided over a screen of the display unit.

The image processing system may advantageously further comprise a printer for printing on printing paper an image processed by the image processor. In this case, the image processor supplies the printer with images on which it performs processing including enlarging or reducing in accordance with a plurality of printing sizes, and the printer prints the images supplied thereto in the plurality of printing sizes.

The image processor may advantageously comprise an image combiner for combining the image selected by the selection operation unit with an image prepared in advance. In this case, the image combiner combines a plurality of images sensed by the image reader into a single picture, or it enlarges or reduces the image of a document size selected by the selection operation unit to insert it into a single picture.

According to the present invention, there is also provided a photomontage system comprising: an image reader for sensing an image by scanning a printed photograph; a processor for combining the image supplied from the scanner with an image prepared in advance; and a printer for printing on printing paper a picture combined by the processor, wherein the image reader can be set in a mode in which it can sense one of printed photographs of a plurality of sizes among their service sizes, and scan the printed photograph in a scanning field defined by a maximum size of the plurality of sizes, and wherein the processor includes a display unit for displaying, in accordance with the service sizes, a plurality of images formed from the image read by the image reader, and a selection operation unit for selecting, in response to the plurality of images displayed on the display unit, a size of the printed photograph sensed by the image reader.

Here, the image reader, the processor and the printer may advantageously be placed in a housing, and the image reader may comprise a flat-bed type scanner with a flat scanner surface on which a document is placed, part of the scanner protruding from a surface of the housing, the protruding part including at least a portion of the scanner surface, on which a printed photograph of the maximum size can be placed.

The image scanner may comprise a paper depressor for pressing against the scanner surface the document placed thereon, and the paper depressor can be opened and closed, and may be provided, on a surface opposite to the scanner surface, with border indications indicative of scanning fields associated with the document sizes, and with marks or logos added outside of the border indications each to represent the document sizes, the border indications and marks or logos being sensible by the image scanner in conjunction with the sensed image.

The selection operation unit may comprise a touch panel provided over a screen of the display unit, and the touch panel may be used for selecting the document size of the printed photograph, for selecting a combined image and for selecting a printing size.

The processor may supply the printer with images which it processes in response to operation of the selection operation unit, and the printer may print, in a plurality of printing sizes, the images supplied to the printer.

The processor may combine, in a single combining processing, images sensed from a plurality of printed photographs by the image reader into a single picture.

The processor may enlarge or reduce the image of a document size selected by the selection operation unit to form a single picture.

The processor may have the display unit display, when selecting a document size, a plurality of frames of the service sizes to be handled, and display in the frames images which are clipped, in accordance with the service sizes, from the image sensed by the image reader, and are applied to the frames, and the processor may carry out combining processing of an image selected by the selection operation unit from among the displayed images, in accordance with the size of the image selected.

The processor may have the display unit display, when selecting the document size, a plurality of frames whose sizes are determined in advance in accordance with the service sizes, and display in the frames images which are clipped, in accordance with the service sizes, from the image read by the image reader, undergo scaling to nearly a same size, and are applied to the frames, and the processor may carry out combining processing in response to an image selected by the selection operation unit from among the images displayed, in accordance with the size of the image selected.

The processor may have the display unit display, when selecting the document size, the plurality of images based on the image sensed by the image reader in a manner that the images are applied to a plurality of frames whose sizes are determined in advance in accordance with the service sizes of the printed photographs, and that first regions to be subjected to image processing and second regions not to be subjected to the image processing are distinguishably displayed in each of the frames, and the processor may carry out combining processing in response to an image selected by the selection operation unit from among the images displayed, in accordance with the size of the image selected.

The processor may have the display unit display a combined image produced by combining the image selected by the selection operation unit with an image prepared in advance, and the processor may carry out positioning, and enlargement or reduction of the selected image on the display unit in response to operation of the selection operation unit.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
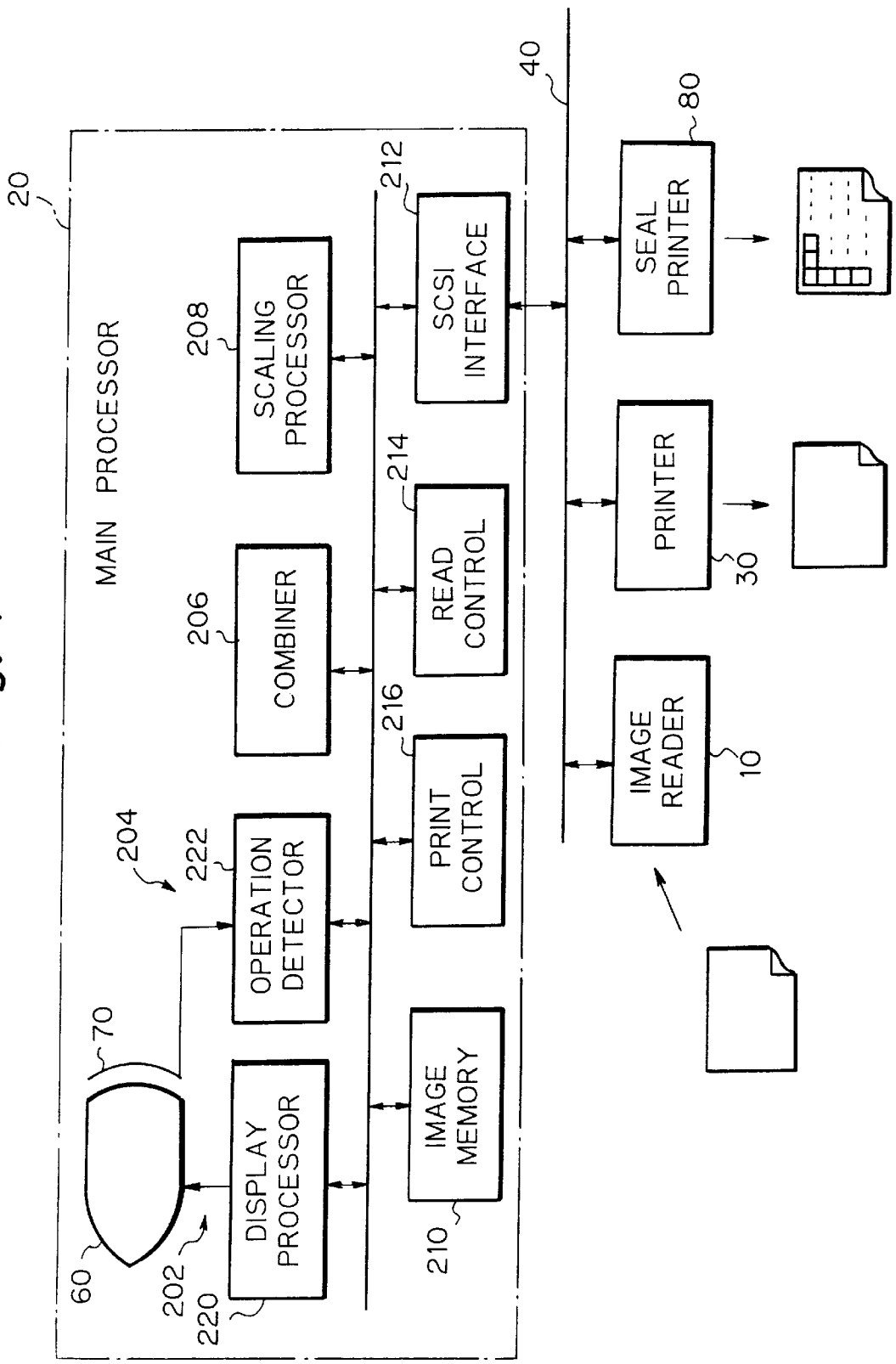
FIG. 1 is a functional block diagram schematically showing an embodiment of a photomontage system in accordance with the present invention.
Figure 2:
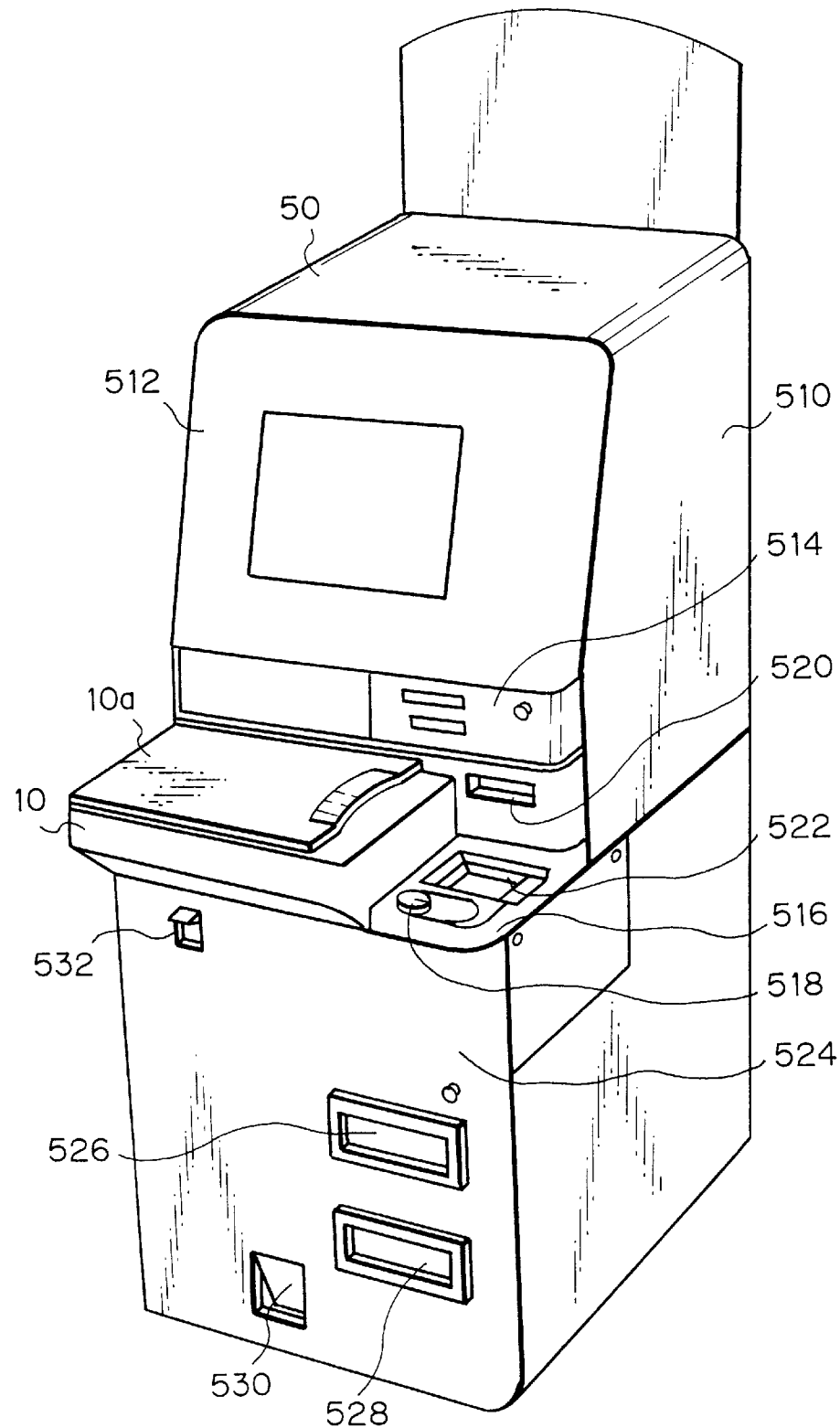
FIG. 2 is a perspective view showing the appearance of the embodiment of the photomontage system shown in FIG. 1.

Referring to FIGS. 1 and 2, a illustrative embodiment of an image processing system in accordance with the present invention performs predetermined processings on images sensed from documents of any one of a plurality of document sizes such as the printed photograph sizes including a plurality of the service sizes. The instant embodiment will be described in connection with the image processing system applied to a photomontage system that interconnects an image reader 10 for sensing an image from a printed photograph; a main processor 20 including a combiner processor for combining sensed images with a prepared image; and a printer 30 for printing a resultant, composite image.

In particular, the photomontage system in accordance with the embodiment comprises in its main processor 20 a display for displaying a plurality of selection images formed by applying an image sensed by the image reader 10 to frames of the service sizes of the printed photographs, and a selection operation section for a user to select from among the selection images an image correctly displayed, so that the user makes a visual decision of the document size to operate the system.

Specifically, the present embodiment of the photomontage system comprises as shown in FIG. 1 the image reader 10, main processor 20 and printer 30, which are interconnected through a SCSI (small computer system interface) cable 40, and are placed in a housing 50 with an L-like box-shaped appearance such that they are disposed at positions suitable for the user operation.

The main processor 20 is located in an upper compartment 510 of the housing 50 as shown in FIG. 2 in such a fashion that the screen of its display unit 202 faces a user through an opening formed in a front panel 512 of the housing 50. More precisely, the front panel 512 of the housing 50 is slightly inclined toward the top rear, and its opening includes the screen on which a touch panel of the selection operation section is attached, which will be described below. At the bottom of the front panel 512 on which the touch panel is disposed, a plate 514 is removably mounted in which a slot is formed in lateral direction through which a floppy disk is inserted into the main processor 20. This enables the system to acquire images from a floppy disk, although the present embodiment has no direct connection.

On a console 516 at the middle of the housing 50, the image reader 10 is mounted such that it protrudes from the housing 50 with its scanner surface upward. More specifically, it is disposed with its rear part inserted into the housing 50 and its front part exposed so that a printed photograph of the maximum size, the 2L size, for example, handled in the present embodiment, can be placed on the exposed portion. In addition, on the exposed top surface of the scanner, a paper depressor or rid 10a for pressing a printed photograph onto the top surface is provided in such a manner that it can be freely opened and closed.

At the right-hand side in the figure of the image reader 10 on the console 516 of the housing 50, a coin slot 518 is formed, under which a coin machine is disposed in the housing 50. The coin machine stores inserted coins and has the image reader 10 start its processing. At the right-hand side of the image reader 10, a card inlet 520 and a film inlet 522 are also provided as an option for a card reader for reading out image data from a memory card for an electronic still camera and an APS (advanced photograph system) scanner sensing images from APS negatives, respectively, although the present embodiment has no direct connection therewith.

In a lower compartment in the housing 50, the printer 30 of the present embodiment is mounted, and a first paper outlet 526, through which printed paper from the printer 30 is output, is formed in a front panel 524. Below the first paper outlet 526, a second paper outlet 528 is formed which is used when a seal printer is installed which is exclusively used for a seal or label sheet, and will be described later. The front panel 524 can be freely opened or closed to replenish printing paper. An outlet 530 for returned coins is provided at a below left of the second paper outlet 528, and an opening, through which a money return lever 532 is projected, is formed at an above left of the front panel 524.

Returning to FIG. 1, the detail of the components of the system will be described. The image reader 10 of the embodiment is a flat-bed type scanner with a flat surface on which a printed photograph is placed. The image reader 10 is adapted to scan a printed photograph placed on the scanner surface, at least on its part protruding from the housing 50 in the embodiment, thereby sensing its image. It is preferable that the scanning field can be freely set in the image reader 10, so that it is set at a range corresponding to the maximum size of the printed photograph, the 2L size in the present embodiment, thereby making it possible to scan any size of the printed photograph placed on the scanner.

It is assumed in the present embodiment that the printed photograph has four service sizes: the economy (EC) size, L size, high-definition television (HV) size and 2L size. The L size is 128 mm by 89 mm, the economy size is slightly smaller than the L size, the high-definition television size is longer in width than the economy size, and the 2L size has an area twice as large as the L size. It is obvious that the king size or other sizes may be included.

The image reader 10 of the present embodiment is a color scanner that sequentially supplies the main processor 20 with image data, line-by-line, of the printed photograph placed thereon at a predetermined resolution. For example, the image reader 10 outputs 24-bit dot-sequential RGB (red, green and blue) image data for each pixel at a resolution of 300 dpi (dots per inch).

The main processor 20 has a function of combining the image from the image reader 10 with a prepared image to create a composite image. In particular, the main processor 20 includes a user interface for displaying operation pictures, and for carrying out its processing in response to the operation the user applies to the operation pictures. It can be implemented by a personal computer (PC) loaded with software provided by a CD-ROM, or the like, in the present embodiment. FIG. 1 shows its functional block diagram.

In FIG. 1, the main processor 20 of the present embodiment comprises a display unit 202, a selection operation section 204, a combiner processor 206, a scaling processor 208, an image memory 210, a SCSI interface 212, a read controller 214 and a print controller 216. The display unit 202 includes a display device 60 such as a CRT (cathode-ray tube) and a display processor 220 that carries out display processing, and sequentially displays, in response to the user operation, a selection picture for designating the print size, a selection picture for selecting a background design or calendar to be combined with the read image, a selection picture for designating the document size of the sensed image and an operation picture for allocating images at the image combining.

For example, the selection picture for the print size includes A5 and A6 sizes in the embodiment, and shows the images of the printing paper, or the images of the printing paper of the seal printer and their charges, if necessary. The selection picture is displayed immediately after an initial picture or demonstration picture displayed in response to the start operation of the user. The selection picture for the composite images includes a plurality of templates showing background designs, or a month and year selection picture in the case of a calendar. This selection picture is displayed after the selection for the print size and the insertion of the charge.

Figure 3:
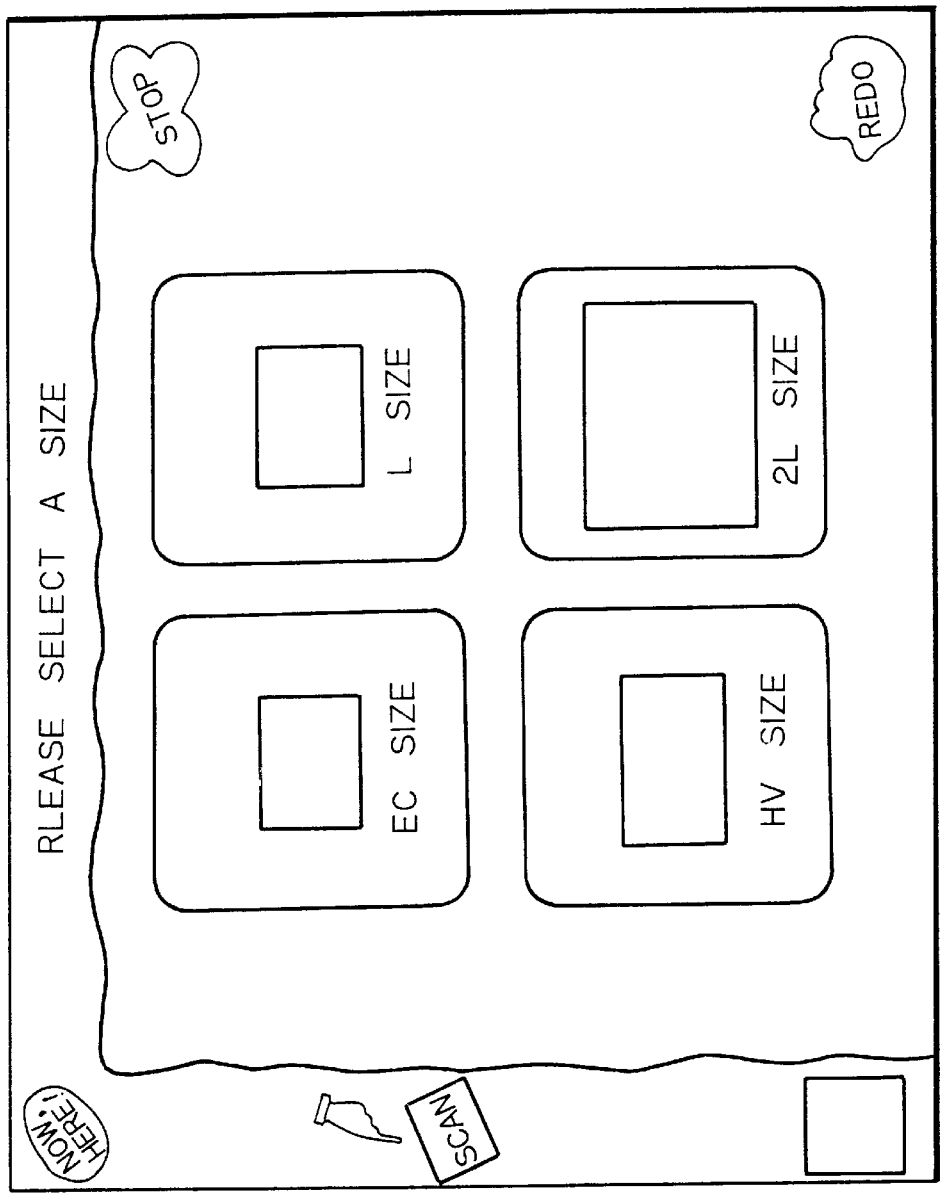
FIG. 3 shows an example of a displayed picture in the embodiment of the photomontage system shown in FIG. 1.
Figure 8:
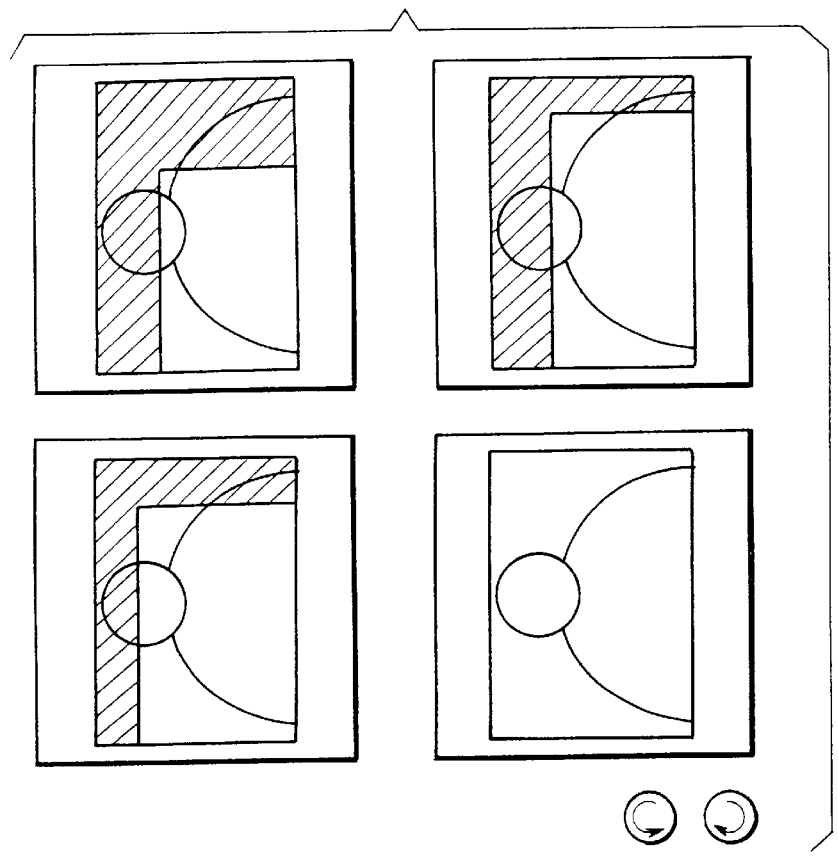
FIG. 8 shows an example of a displayed picture in the embodiment of the photomontage system shown in FIG. 1.

The document size selection picture of this embodiment has four frames of the sizes dealt with the present system as shown in FIG. 3, and the image sensed by the image reader 10 in the maximum size is applied to the frames. The frames are displayed rotatably with the images applied thereto as shown in FIG. 8. Before the selection picture is displayed, a guidance image is displayed that invites the user to place the printed photograph on the scanner 10 and push the start button.

In the image allocation picture, the composite image is displayed along with a first operation button image for shifting the sensed image vertically or horizontally, a second operation button image for scaling or magnifying/reducing it and a third operation button image for rotating it.

The display processor 220 prepares the images described above, and sequentially displays them on the display 60 in accordance with the instructions from the selection operation section 204.

The selection operation section 204, including a touch panel 70 placed on the screen of the display 60 and an operation detector 222 for locating user's operation positions on the touch panel, constitutes a user interface in conjunction with the display unit 202. The operation detector 222 locates, in the print size selection picture, for example, a touched position on the touch panel 70 to identify a desired printed size, supplies the scaling processor 208 with the result from identifying the size, and sends to the display processor 220 a command to switch the picture. The detector 222 locates, in the composite image selection picture, the touched position of the template of the background design, or that of the selection button of the month and year of the calendar, supplies the combiner processor 206 with the result therefrom, and sends to the display processor 220 the command to switch the picture. The detector 222 also supplies the read controller 214 with a read start command in response to the detection of the read start operation, supplies the combiner processor 206 with the touched location in one of the four frames in the size selection picture, and supplies the combiner processor 206 with the operation result in the image allocation picture.

The combiner processor 206 is an image processor for combining sensed images with a prepared image. The processor 206 includes a memory controller and carries out the combining processing by controlling the image memory 210. In particular, in the embodiment, the processor 206 clips images from the sensed images supplied from the image memory 210 in accordance with the document size selection operation in the selection operation section 204, and forms a composite image by pasting them in predetermined positions in a selected background design or in a selected sheet of the calendar. The present embodiment can paste up to three read images into one composite image, for example.

The scaling processor 208 is also an image processor adapted for scaling (enlarging or reducing) the composite image produced from the combiner processor 206 in accordance with the print size. The scaling processor 208 sets the degree of the scaling in response to the instruction from the selection operation section 204. The instant embodiment may preferably include a memory controller for decimating the pixels of the composite image by reading out them from the image memory 210 intermittently at predetermined intervals during the image reduction operation.

The image memory 210 is adapted to store the image data acquired by the image reader 10, and the processed image data. In the embodiment, memory areas are reserved on the main memory of the image reader 10 for storing at least read-out data corresponding to three 2L-size printed photographs and their processed images.

The SCSI interface 212 provides a system interface between the main processor 20 and external devices such as the image reader 10 and printer 30 connected to the cable 40, and transfers and receives the image data under the control of the read controller 214 and print controller 216 in the embodiment.

The read controller 214 controls the image reader 10 via the SCSI interface 212. For example, the controller 214 actuates the image reader 10 in response to the read start command from the selection operation section 204, and writes the read-out image data into the SCSI interface 212. When carrying out a multiple times of sensing, the controller 214 sets the image reader 10 in its waiting state during the image size selection, and stops the image reader 10 in response to the depression of a read end button. The present embodiment can possess a function of setting the scanning field of the image reader 10, and set it at the 2L size in advance. When reader devices such as the APS scanner and/or PC card reader are connected in addition to the image reader 10, the read controller 214 controls their switching and their individual operation.

The print controller 216 controls the printer 30 through the SCSI interface 212. For example, the printer control 216 is adapted to start the printer 30 in response to a print command from the selection operation section 204, and supplies the printer 30 with the processed image data from the scaling processor 208. It also controls, when the seal printer 80 is connected, switching between the printers 30 and 80, and their individual operation just as the read controller 214.

The printer 30 is adapted to print, in the size selected by the selection operation section 204, the image processed by the main processor 20. A thermal transfer type or thermal sublimative type of full-color printer can be preferably used, and more preferably, a printer for applying gloss finish such as applied to printed photographs. The printer of the present embodiment may advantageously be adapted to select one of the print sizes having a common width such as A5 and A6 sizes, and be loaded with a roll of paper with the common width which is cut into these sizes to be ejected. Although a printer is used that is adapted to directly print on the printing paper in the embodiment, the seal printer 80 may be connected instead that prints composite images on an A6 seal or label sheet divided into 16 pieces.

The operation of the present embodiment of the photomontage system with the foregoing configuration will now be described in connection with user operation. First, the display 60 shows the initial picture or demonstration picture. Then, when an user or operator touches a predetermined position on the screen, that is, on the touch panel 70, the operation detector 222 detects his or her touch, and in turn commands the display processor 220 to change the picture. Receiving the command, the display processor 220 displays the print size selection picture on the display 60.

Next, when the user selects a desired printing paper size on the screen, the operation detector 222 set the result in the scaling processor 208 and print controller 216, and commands the display processor 220 to change the picture. Thus, the display processor 220 displays on the display 60 a picture for requesting the insertion of coins for the charge.

After the user inserts coins for the appropriate charge, the display processor 220 displays the background and calendar selection picture. When the user selects from it a desired background design, or a desired month and year of the calendar, the operation detector 222 detects the result, sets it in the combiner processor 206, and commands the display processor 220 to change the picture. Thus, the combiner processor 206 prepares the selected design or pasting paper to the calendar, and waits for the following instructions.

On the other hand, the display processor 220 displays on the display 60 an instruction picture for prompting setting of a printed photograph on the image scanner 10. When the user sets a printed photograph on the scanner 10 in response to this, and touches the start button on the screen, the operation detector 222 detects the touch, and supplies the read controller 214 with a read start command.

In response to this, the read controller 214 enables through the SCSI interface 212 the image reader 10, which sequentially senses the image from the printed photograph set thereon. Thus, the data of the image sensed by the image reader 10 is supplied through the SCSI interface 212 to the image memory 210 to be sequentially stored in its predetermined area.

Figure 4:
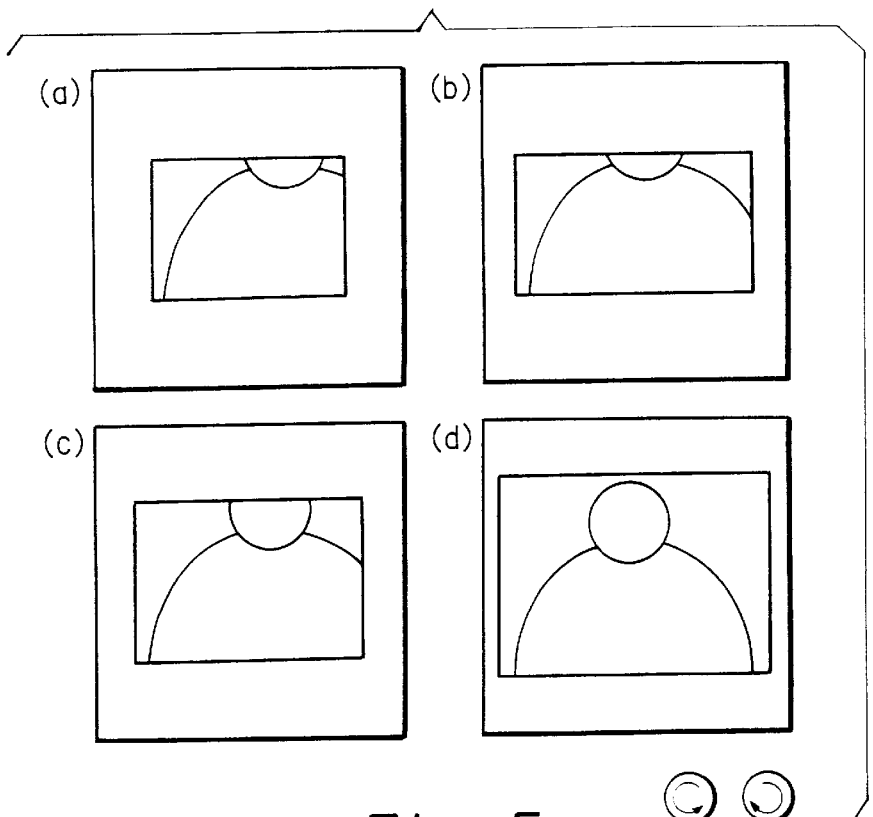
FIG. 4 shows an example of a displayed picture in the embodiment of the photomontage system shown in FIG. 1.

After the image reading has been completed, the display processor 220 displays the four frames as shown in FIG. 3, applies to the frames images which are clipped, in accordance with the respective sizes, from the sensed image stored in the image memory 210, and displays the selected picture as shown in FIG. 4. In this case, if the printed photograph is of the 2L size, although a correct image is displayed in the 2L frame as shown in part (d) of FIG. 4, parts of the sensed image are cut off in the other frames as shown in parts (a) (b) and (c) of FIG. 4.

When the user selects the 2L size frame by touching it, for example, the selection result is supplied from the selection operation section 204 to the combiner processor 206. Thus, the combiner processor 206 clips the 2L size image from the initially sensed image, and combines it with the prepared background design, or pastes it on the predetermined position on the pasting paper of the calendar.

Then, the user sets, if there is any other photographs to be read following the first one, a second printed photograph on the scanner 10, and depresses the start button. In response, the scanner 10 scans the printed photograph in the same manner as described above, and its image data is sequentially stored in an area on the image memory 210 different from that of the first one. After the sensing and storing have been completed, the image is applied to the four frames with different sizes, and their selection picture is displayed as described above. Thus, the user selects the appropriate one, and its result is set in the combiner processor 206 which carries out its combining processing as in the above.

Likewise, if the user has a third printed photograph to be presented, then its image is sensed, and the appropriate document size is selected in the same manner. After completing sensing of the desired number of pictures, and selecting of their sizes, the user presses the read end button. This causes the operation detector 222 to supply a read end command to the combiner processor 206 and read controller 214, and a picture change command to the display processor 220. In turn, the read controller 214 stops the image reader 10, and the display processor 220 reads out the image data processed by the combiner processor 206, and displays on the display 60 the operation picture for the image allocation.

Subsequently, the user makes a decision on the operation picture of the image allocation as to whether or not the allocations and sizes of the first to third sensed images are appropriate. For example, to reduce the first image and enlarge the second one, the user selects the image and operates the size changing button. The operation result is detected by the operation detector 222 and is supplied to the combiner processor 206 which enlarges or reduces the image in response to that, and supplies the result to the display processor 220. As a result, the processed image is displayed on the screen. Likewise, the combiner processor 206 carries out movement and rotation processing of the image, and displays the result, if the user inputs the instructions with the operation buttons.

When the desired image allocation is obtained by the operation, the user depresses the print start button, by which the operation detector 222 supplies the print controller 216 with a print start command. The print controller 216 activates through the SCSI interface 212 the printer 30 or seal printer 80, and reads out the composite image data, which undergoes the scaling processing by the scaling processor 208 in accordance with the print size, and is sequentially supplied to the printer 30. Thus, the printer 30 sequentially prints on the printing paper the image represented by the image data, cuts, when the printing is over, the roll of paper into the appropriate size, and ejects the printed photograph from the first paper outlet 526.

Detecting the completion of the printing by the printer 30, the print controller 216 sends a print end command to the display processor 220. Thus, the display 60 displays a print end picture which indicates that the printing has been completed, and displays an additional print button image and an end button image. The user may depress the additional print button to print the same picture, or the end button to terminate the printing or to print another picture.

When the additional print button is depressed, an additional-charge picture is displayed, and when coins for the charge are inserted, the printing as described above is redone by reading out the processed image data again. On the other hand, when the end button is depressed, the printer 30 stops, thereby completing the processing. Thus, the displayed picture is changed to the initial picture.

In the same manner, other printed photographs can be processed, and other composite pictures can be obtained by repeating the operation as described above.

As described above, according to the present embodiment of the photomontage system, a user-desired composite image can be printed from desired, printed photographs through the simple operation following the instructions displayed on the screen. In particular, since the present embodiment applies the data of the printed photograph sensed to the frames of the respective service sizes, the user can easily select the frame to which the read image is appropriately applied without knowing the size of the printed photograph. Thus, the present embodiment can determine the appropriated size, and achieve the processing correctly.

Figure 5:
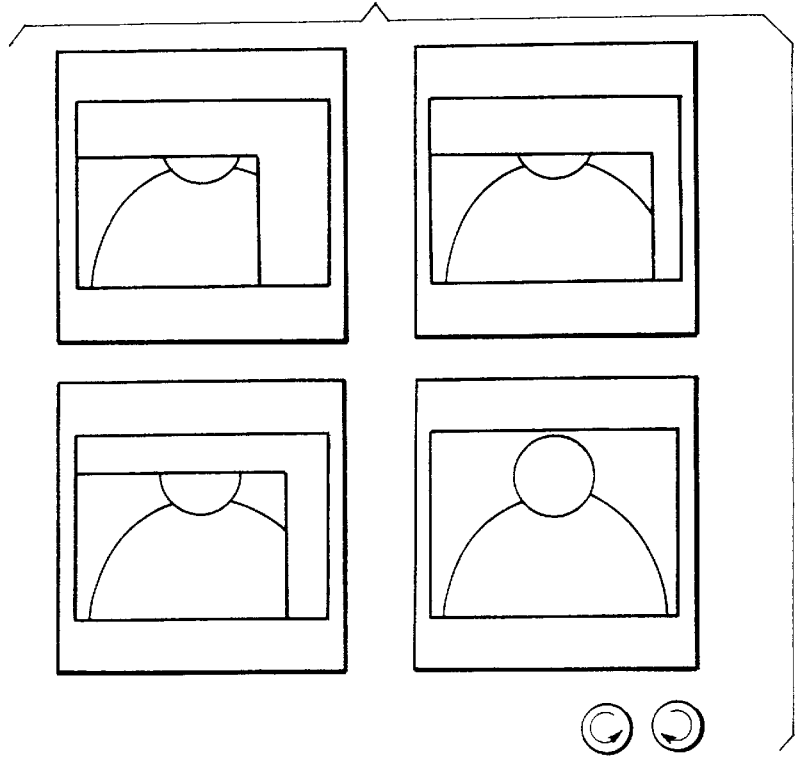
FIG. 5 shows, like FIG. 4, a displayed picture in an alternative embodiment of the photomontage system in accordance with the present invention.

Although the frames with the service sizes are prepared in the display unit 202 as shown in FIGS. 3 and 4, and the images to be applied to the frames are clipped from the data sensed in the maximum size to form the selection picture in the instant embodiment, this is not essential. For example, as shown in FIG. 5, a plurality of frames of the maximum size can be prepared, and images of the respective sizes can be clipped from the sense image, so that the selection picture is displayed which includes the clipped images applied to the frames.

Figure 6:
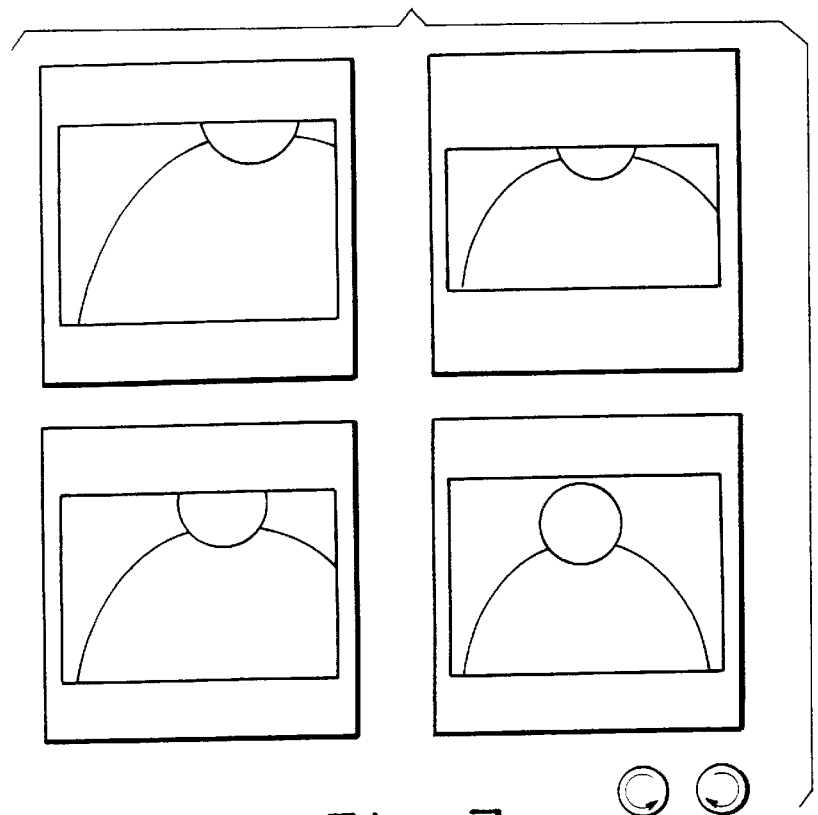
FIG. 6 shows, like FIG. 4, a displayed picture in another alternative embodiment of the photomontage system in accordance with the invention.

In addition, as shown in FIG. 6, the clipped image of the respective sizes can be enlarged up to the size of their display areas, and the selection picture including them may be displayed.

Figure 7:
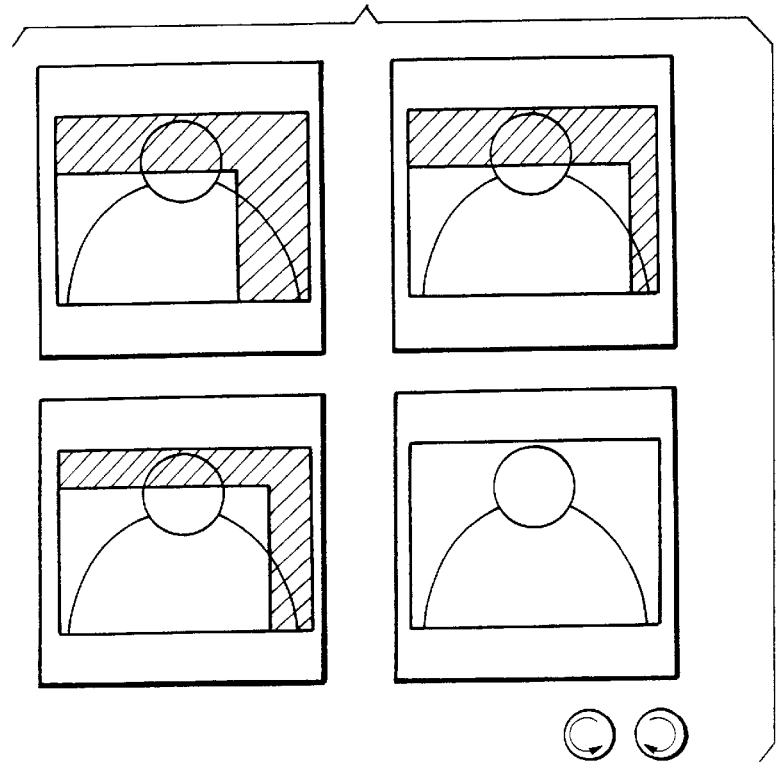
FIG. 7 shows, like FIG. 4, a displayed picture in still another alternative embodiment of the photomontage system in accordance with the invention.

Furthermore, the image sensed in the maximum size may be displayed without change in the frames as shown in FIG. 7, and regions to be processed and not to be processed in the images clipped in accordance with the service sizes may be visually distinguishably displayed with different luminance, for example. In this case, the regions not to be processed can be indicated by shadows to distinguish them from the regions to be processed.

Figure 9:
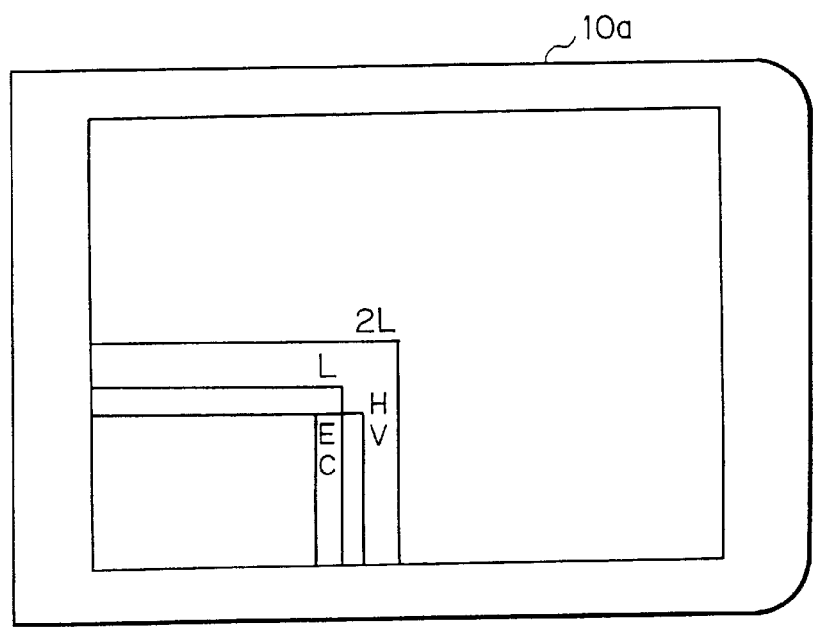
FIG. 9 is a plan view schematically showing a major portion of an image scanner in a further alternative embodiment of the photomontage system in accordance with the present invention.

Although the paper depressor 10a of the image reader 10 is not marked at all in the illustrative embodiment, the paper depressor may be provided on its bottom with marks indicating the sensing fields associated with the service sizes, and with logos or marks indicating the document sizes such as EC, HV, L and 2L which are written at the outside of the sensor fields as shown in FIG. 9. This enables the logos to be displayed within the frame of an image of a particular size clipped from an image of a smaller size. Discarding such a displayed image as undesirable, the user can select the image size more correctly.

Although the foregoing embodiment of the image processing system is described by taking an instance of the photomontage system that combines images sensed from printed photographs with a prepared image, the present invention can be applied to other image processing systems, such as those that simply copy pictures from printed photographs, enlarge or reduce the printed photographs, or carry out any other image processings.

Furthermore, although the foregoing embodiment is described by taking an instance that prints visula pictures by printers like the printer 30, the present invention can record the processed images on a recording medium such as a floppy disk or memory card.

Moreover, although the illustrative embodiment is described by taking an instance of the processing system interconnecting the image reader 10, main processor 20 and printer 30, the present invention can also be applied to an image processing system like a copy machine that comprises as its integral part an image reader, processor and printer. In this application, it is preferable that the system includes a display and selection operation section with the same functions as those described above.

According to the image processing system in accordance with the present invention, since a plurality of read images are displayed in accordance with the document sizes, and an appropriately displayed one is selected from among them as a desired size, it has an advantage of being able to select the correct document size and achieve effective processing, even if a user does not know the document size.

The entire disclosure of Japanese patent application No. 153855/1997 filed on Jun. 11, 1997 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What I claim is:

1. An image processing system for processing an image carried on a document having a document size selected from a plurality of document sizes, comprising:

an image reader for sensing a first image carried on the document in an area substantially equal to a maximum document size of the plurality of document sizes, and producing an image signal representing the first image;

a display circuit having a display screen for clipping at least part of the first image represented by the image signal with each of a plurality of frames corresponding to the plurality of document sizes without being enlarged or reduced to form a corresponding plurality of second images, and displaying the plurality of second images in parallel with each other on the display screen, each of the second images being enclosed with corresponding one of the plurality of frames;

a selection operation unit for selecting one of the plurality of second images displayed by said display circuit; and an image processor for processing the one second image selected by said selection operation unit in accordance with the document size corresponding to the frame with which the one second image is formed in combination.

2. The system in accordance with claim 1, wherein said image reader comprises a flat-bed type image scanner with a flat scanner surface on which the document is placed, said image scanner scanning the document in a scanning field defined by the maximum independently of an actual document size of the document placed on said image scanner.

3. The system in accordance with claim 2, wherein said image scanner comprises a paper depressor for pressing the document placed thereon against the scanner surface, said paper depressor being provided, on a surface opposite to the scanner surface, with borders indicative of scanning fields associated with the document sizes, and with marks added outside the borders each to represent the document sizes, said borders and marks being sensible by said image reader in conjunction with the sensed image.

4. The system in accordance with claim 1, wherein said display circuit displays the plurality of frames whose sizes are determined in advance in accordance with the document sizes, and displays in said frames images which are clipped, in accordance with the document sizes, from the image sensed by said image reader, and are applied to said frames.

5. The system in accordance with claim 4, wherein said display circuit displays the images in said frames in a manner that they are rotatable together with the frames.

6. The system in accordance with claim 1, wherein said display circuit displays the plurality of frames whose sizes are determined in advance in accordance with the document sizes, and displays in said frames images which are clipped, in accordance with the document sizes, from the image sensed by said image reader, undergo scaling to nearly a same size, and are applied to said frames.

7. The system in accordance with claim 1, wherein said display circuit displays the plurality of frames whose sizes are determined in advance in accordance with the document sizes, and displays in said frames images which are clipped, in accordance with the document sizes, from the image sensed by said image reader, and are applied to said frames, said images in said frames including first regions to be processed by said image processor and second regions not to be processed by said image processor, said first regions and second regions being displayed in a visually distinguishable manner.

8. The system in accordance with claim 7, wherein said display circuit displays said first regions and second regions with luminances different from each other.

9. The system in accordance with claim 7, wherein said display circuit displays said first regions and second regions with shadowing either of said first and second regions.

10. The system in accordance with claim 1, wherein said selection operation unit comprises a touch panel provided over a screen of said display unit, and selects an image size by detecting one of the second images that is touched on said display circuit.

11. The system in accordance with claim 1, further comprising a printer for printing an image processed by said image processor on paper.

12. The system in accordance with claim 11, wherein said image processor supplies said printer with data of images on which said image processor performs processing including enlarging or reducing in accordance with a plurality of printing sizes, and said printer prints the images supplied thereto in said plurality of printing sizes.

13. The system in accordance with claim 1, wherein said image processor comprises an image combiner for combining the one second image selected by said selection operation unit with an image prepared in advance.

14. The system in accordance with claim 13, wherein said image combiner combines a plurality of images sensed by said image reader into a single picture.

15. The system in accordance with claim 13, wherein said image processor enlarges or reduces the image of a document size selected by said selection operation unit to insert it into a single picture.

16. A photomontage system comprising:
an image reader for scanning a printed an image reader for scanning a printed photograph to sense a first image carried by the photograph in an area substantially equal to a maximum service size of a plurality of service sizes, and producing an image signal representing the first image;
a processor for combining the first image represented by the image signal with a second image prepared in advance to produce a combined image; and
a printer for printing the combined image on printing paper, said processor comprising:
a display circuit for having a display screen clipping at least part of the first image represented by the image signal with each of a plurality of frames corresponding to the plurality of service sizes without being enlarged or reduced to form a corresponding plurality of third images, and displaying the plurality of third images; in parallel with each other on the display screen, each of the second images being enclosed with corresponding one of the plurality of frames; and
a selection operation unit for selecting a desired service size of the first image, based on the plurality of third images displayed by said display circuit;
said processor processing one of the plurality of third images which corresponds to the one service size selected by said selection operation unit.

17. The system in accordance with claim 16, further comprising a housing for placing therein said image reader, said processor and said printer,
said image reader comprising a flat-bed type scanner with a flat scanner surface on which the printed photogaph is placed, part of said scanner protruding from a surface of said housing, the protruding part including at least a portion of the scanner surface, on which the printed photograph of the maximum service size can be placed.

18. The system in accordance with claim 17, wherein said image scanner comprises a paper depressor for pressing against the scanner surface the printed photograph placed thereon,
said paper depressor being capable of being opened and closed, and provided, on a surface opposite to the scanner surface, with border indications indicative of scanning fields associated with the service sizes, and with marks added outside the border indications to represent the service sizes, said border indications and marks being sensible by said image scanner in conjunction with the sensed image.

19. The system in accordance with claim 16, wherein said selection operation unit comprises a touch panel which is provided over a screen of said display circuit, and by touching which the service size of the printed photograph, the combined image and a printing size are selected.

20. The system in accordance with claim 19, wherein said processor supplies said printer with the combined images which said processor processes in response to operation of said selection operation unit, and said printer prints, in a plurality of printing sizes, the combined images supplied to the printer.

21. The system in accordance with claim 20, wherein said processor combines, in a single combining processing, the first images sensed from a plurality of printed photographs by said image reader into a single picture.

22. The system in accordance with claim 21, wherein said processor enlarges or reduces the one third image corresponding to the one service size selected by said selection operation unit to form a single picture.

23. The system in accordance with claim 16, wherein said processor has said display circuit display, when selecting a service size, a plurality of frames of the service sizes to be handled, and display in said frames the third images which are clipped, in accordance with the service sizes, from the first image sensed by said image reader, and are applied to the frames, said processor carrying out combining processing of the one third image corresponding to the one service size selected by said selection operation unit from among the displayed third images, in accordance with the one service size selected.

24. The system in accordance with claim 23, wherein said processor has said display circuit display the third images in said frames in a manner that they are rotatable together with the frames.

25. The system in accordance with claim 23, wherein said processor has said display circuit display the combined image produced by combining the one third image corresponding to the one service size selected by said selection operation unit with the second image prepared in advance, said processor carrying out positioning, and enlargement or reduction of the one third image on said display circuit in response to operation of said selection operation unit.

26. The system in accordance with claim 16, wherein said processor has said display circuit display, when selecting the service size, a plurality of frames whose sizes are determined in advance in accordance with the service sizes, and display in said frames the third images which are clipped, in accordance with the service sizes, from the first image sensed by said image reader, undergo scaling to nearly a same size, and are applied to said frames, said processor carrying out combining processing in response to the one third image corresponding to the one service size selected by said selection operation unit from among the third images displayed, in accordance with the one service size selected.

27. The system in accordance with claim 16, wherein said processor has said display circuit display, when selecting the service size, said plurality of third images based on the first image sensed by said image reader in a manner that said first images are applied to a plurality of frames whose sizes are determined in advance in accordance with the service sizes of the printed photographs, and that first regions to be subjected to image processing and second regions not to be subjected to the image processing are distinguishably displayed in each of said frames, said processor carrying out combining processing in response to the one third image corresponding to the one service size selected by said selection operation unit from among the third images displayed, in accordance with the one service size selected.

28. The system in accordance with claim 27, wherein said processor has said display circuit display said first regions and second regions with luminances different from each other.

29. The system in accordance with claim 27, wherein said display circuit displays said first regions and second regions with shadowing either of said first and second regions.

* * * * *